UNITED STATES PATENT OFFICE 2,637,645

PLANT GROWTH REGULATION

Nathaniel Tischler, Palmyra, N. J., and Ernest P. Bell, Detroit, Mich., assignors to Sharples Chemicals Inc., a corporation of Delaware No Drawing. Application November 15, 1951, Serial No. 256,598

16 Claims. (Cl. 71—2.5)

The present invention pertains to improved methods and compositions for treating growing plants whereby the normal life cycle of a plant is altered with advantageous results. More particularly it pertains to methods and compositions for treating growing plants with alkyl hydrogen 3,6-endoxohexahydrophthalates of exo-cis isomeric configuration and conforming structurally to the formula

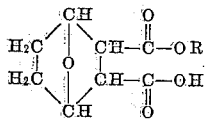

wherein R represents a primary or secondary alkyl radical having from 1 to 8 carbon atoms, such as methyl, ethyl, n-propyl, n-butyl, n-amyl, n-hexyl, n-heptyl, n-octyl, isobutyl, isoamyl, isohexyl, isopropyl, sec.-butyl, 1-methylbutyl, 1,3-dimethylbutyl, diisopropylmethyl, 1-methylheptyl, and similar primary and secondary alkyl radicals.

It is pointed out that these mono-alkyl esters are also monocarboxylic acids, and that such acids undergo reactions which are characteristic of monocarboxylic acids generally, including neutralization with organic or inorganic bases to form salts.

The invention is concerned with the exo-cis isomeric form of the compounds, and for convenience in description and to avoid repetition all references made herein to compounds of the invention are to be construed as meaning the exo-cis form.

The compounds of this invention are unusually versatile, first, with respect to the types of plant response which they are capable of inducing, second, with respect to the types of plants upon which they exert useful effects, and third, with respect to the forms in which they may be used, the latter including, for example, the acids themselves as well as other forms which when in the presence of water yield anions of the acids, such as the water-soluble salts of the acids.

For example, these compounds may bring about such effects as leaf abscission (partial or complete), blossom thinning, vine-kill, total destruction of the plant, or adventitious root formation, the particular plant response manifested depending to a large extent upon the applied concentration of the response agent, technique of application, and the species and degree of maturity of the plant undergoing treatment. The term plant as used herein is understood to include all portions of the plant, such as the roots, stems, leaves, blossoms, seeds, and fruits.

While under suitable conditions any of the foregoing effects may be induced, depending upon the conditions of treatment, the treatment is particularly outstanding in the accelerated induction of plant physiological effects such as defoliation, or such as selective or non-selective killing of plants, and for convenience will be described more particularly with reference thereto. Induced defoliation is the hastened abscission of foliage, brought about by causing certain accelerated physiological effects in certain plants which usually defoliate normally at some stage of their life cycle, such as, at the onset of the winter season; whereas plant kill is a drastic phytotoxic effect of importance in the extermination of dicotyledonous weeds (usually broad-leafed plant species) and of monocotyledonous weeds (including various species of grasses), etc.

It is well known that the presence of excessive foliage at the time of harvesting is undesirable in the case of many crops among which may be mentioned cotton, potatoes, tomatoes, and beans such as soybeans and lima beans. This is particularly true if the crop is to be harvested mechanically. Controlled defoliation greatly facilitates harvesting, and in many circumstances also results in marked improvement in the quality and/or ripening time of the product. Furthermore, the elimination of foliage, after it has served its primary purpose, may be effective in avoiding or minimizing certain late season blights, and/or other undesirable developments. Early defoliation of nursery stock is often desirable to permit the digging and preparation of the stock for shipment at a more convenient time.

By a defoliant is meant a substance which, upon penetrating, in suitable concentration, the epidermal layer of a growing plant which normally tends to defoliate during its life cycle (usually after maturity), brings about an accelerated abscission of the leaves without causing complete destruction of the plant. The ultimate goal in defoliation might be considered to be complete abscission of leaves coupled with negligible injury to the rest of the plant insofar as the final maturation of the crop is concerned. A measure of the value of a defoliant, generally speaking, is the extent to which this ultimate objective is attained. For practicable utility, moreover, the defoliating agent (i. e. defoliant) must be effective in relatively low concentration.

The present invention provides an effective and economical means of defoliating plants which undergo seasonal leaf abscission in the course of their normal life cycle. It is of particular value commercially in the defoliation of cotton, Irish potatoes (i. e. the common white potatoes), sweet potatoes, soybeans, tomatoes, and other plants.

This invention also provides an economical and effective means of destroying undesirable vegetation including many species of unwanted herbs, grasses, ferns, etc. In some instances it may be desired to practice selective destruction of the unwanted species, without causing appreciable damage to desirable species growing in the same area, while in other instances it may be desired to destroy all plants growing in a given area. When the plant response agents are employed to kill weeds, it is usually desirable, though not essential, that they be applied to the weeds prior to full maturity, and preferably when said weeds (i. e. objectionable plants) are fairly young. In some instances, moreover, it may be desirable to kill useful crops to control production, and the invention may advantageously be adapted to such objectives.

To prevent germination of weed seeds and to destroy weed seedlings and plants, various practices are followed in accordance with the particular purpose desired.

In the selective prevention or destruction of undesired weed seedlings or plants, three special kinds of practices have been followed: pre-planting treatment, pre-emergence treatment, and post-emergence treatment. By pre-planting treatment is meant the application of either sprays or dusts, but more commonly sprays, to the soil previous to planting of the crop seeds or plants, usually from one to three weeks previously. By pre-emergence treatment is meant the application of either sprays or dusts, but more commonly sprays, to the soil after the seeds have been planted but before the emergence of the crop seedlings. By post-emergence treatment is meant the application of either sprays or dusts, but more commonly sprays, after the plants have emerged from the soil or after transplanted plants have established themselves. Such post-emergence treatments are usually made while the weed plants are quite small, since in general less chemical is required to destroy young weed plants than fairly mature weeds.

The objective in the case of the pre-planting practice is to destroy weed seeds, weed seedlings, and more fully grown weed plants, before planting the crop seeds or plants so that the herbicidal chemical either will be leached from the soil by rainfall, or will volatilize, if it is one of sufficiently high vapor pressure, or will be decomposed, as for example by microorganisms, in the soil, so that there will be no chance of injury by the chemical to crop plants.

The objective in the case of pre-emergence practice is to destroy young weed seedlings or plants before the crop seeds germinate or before they emerge from the soil.

In the case of post-emergence practice, as a rule, selective herbicidal chemicals must be applied in lower amounts per area than when the same chemicals are applied as pre-emergence agents.

In the practice of the invention there is applied to the plant a composition which contains at least one compound which when in the presence of water yields anions of an acid conforming to the foregoing formula. Any such compound may be in the form of the acid per se or in chemically equivalent form, such as a water-soluble salt; such forms have the common property of yielding anions of the particular acid in the presence of water, and hence are considered to be equivalent for the production of plant response effects. Generically, the anions obtained upon dissolving the acids of this invention or their chemical equivalents in water may be represented by the formula

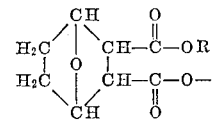

in which the meaning of R is the same as in the above formula which represents the acids.

Thus it will be seen that the acids are the active materials, and that this is so whether they are used as such or in chemically equivalent forms, such as water-soluble salts. These changes at the carboxyl group are mere changes in form rather than changes in substance.

Among the water-soluble salts of particular interest there may be mentioned sodium, potassium, calcium, strontium, magnesium, aluminum, iron, cobalt, nickel, zinc, cadmium, mercury, copper, ammonium, mono-, di-, and trialkylammonium, mono-, di-, and trialkanolammonium salts, and mixed alkylalkanolammonium salts which are N-substituted in the ammonium radical by from 2 to 3 radicals of the type indicated.

The alkylammonium salts such as monoalkylammonium, dialkylammonium, or trialkylammonium preferably have from 1 to 12 carbon atoms in each alkyl radical, the totality of carbon atoms preferably being not more than 12. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, and monododecylammonium, and similar monoalkylammonium salts of acids of the invention.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of acids of the invention.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar trialkylammonium salts of acids of the invention.

Examples of monoalkanolammonium salts are the monoethanolammonium, monopropanolammonium, and similar monoalkanolammonium salts of acids of the invention.

Examples of dialkanolammonium salts are the diethanolammonium, dipropanolammonium, ethanolpropanolammonium, and similar dialkanolammonium salts of acids of the invention.

Examples of trialkanolammonium salts are the triethanolammonium, tripropanolammonium, ethanoldipropanolammonium, propanoldiethanolammonium, and similar trialkanolammonium salts of acids of the invention.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar monoalkyl monoalkanolammonium salts of acids of the invention.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar dialkyl monoalkanolammonium salts of acids of the invention.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar monoalkyl dialkanolammonium salts of acids of the invention.

Examples of acids of the invention are methyl hydrogen 3,6-endoxohexahydrophthalate, ethyl hydrogen 3,6-endoxohexahydrophthalate, n-propyl hydrogen 3,6-endoxohexahydrophthalate, butyl hydrogen 3,6-endoxohexahydrophthalate, n-amyl hydrogen 3,6-endoxohexahydrophthalate, n-hexyl hydrogen 3,6-endoxohexahydrophthalate, n-heptyl hydrogen 3,6-endoxohexahydrophthalate, n-octyl hydrogen 3,6-endoxohexahydrophthalate, isobutyl hydrogen 3,6-endoxohexahydrophthalate, isoamyl hydrogen 3,6-endoxohexahydrophthalate, isohexyl hydrogen 3,6-endoxohexahydrophthalate, isopropyl hydrogen 3,6-endoxohexahydrophthalate, sec-butyl hydrogen 3,6-endoxohexahydrophthalate, 1-methylbutyl hydrogen 3,6-endoxohexahydrophthalate, 1,3-dimethylbutyl hydrogen 3,6-endoxohexahydrophthalate, diisopropylmethyl hydrogen 3,6-endoxohexahydrophthalate, and 1-methylheptyl hydrogen 3,6-endoxohexahydrophthalate.

The preparation of the acids per se and their equivalents may be accomplished by any means know to the art, and suitable methods will suggest themselves to persons skilled in chemical synthesis.

For example, the acids may be prepared by reacting equimolar quantities of exo-cis-3,6-endoxohexahydrophthalic anhydride and a primary or secondary saturated, monohydric, aliphatic alcohol, reaction proceeding in accordance with the equation:

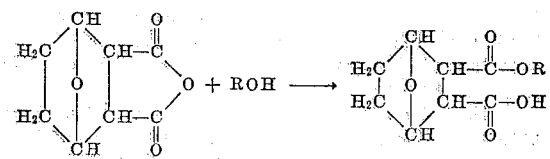

wherein R represents a primary or secondary alkyl radical having from 1 to 8 carbon atoms.

In some instances it may be preferred to bring the reactants together in stoichiometric amounts as shown in the foregoing equation, in the presence or absence of inert reaction media, such as hexane, benzene, toluene, etc. In other instances, it may be preferred to employ the alcohol in considerably more than stoichiometric amount, the excess alcohol serving as a reaction medium. However, in order to facilitate recovery of the desired product after the reaction has been completed, gross excesses of alcohol should not be employed.

Reaction sometimes occurs at ordinary temperature, although it is usually helpful to employ somewhat elevated temperatures, such as up to say 125° C., in order to speed the reaction. Temperatures appreciably greater than 125° C. may be somewhat conducive to side reactions, such as, di-esterification, and hence are less preferred.

In some instances (such as when methanol is a reactant) the use of a catalyst is unnecessary and may even be undesirable, while in other instances a small amount of catalyst (e. g. hydrochloric acid) may be added to the mixture in order to speed the reaction.

It is pointed out that when a substantial excess of the alcohol is present in the reaction mixture, a possible side reaction is esterification of the desired alkyl hydrogen 3,6-endoxohexahydrophthalate, i. e., formation of the undesired dialkyl ester (neutral ester) of 3,6-endoxohexahydrophthalic acid. In such instances it is advisable to observe the following precautions, in order to avoid the formation of any substantial amount of neutral ester: (1) the reaction temperature should be maintained as low as is consistent with causing the desired reaction to proceed at a reasonable speed; (2) the reaction time should be as short as is consistent with causing the desired reaction to go to completion; and (3) no part of the reaction mixture should be removed during the reaction period.

The following specific examples are illustrative of the preparation of the acids per se, and their equivalents.

EXAMPLE 1

Exo-cis-3,6-endoxohexahydrophthalic anhydride (217 g.) was dissolved in 500 ml. of boiling absolute ethanol. A few drops of concentrated aqueous hydrochloric acid were added to the hot solution, which was maintained near its boiling point for 30 minutes. The mixture was then cooled to about 5° C. in order to cause the product to crystallize. The product was filtered off and air-dried. The ethyl hydrogen 3,6-endoxohexahydrophthalate thus obtained had a neutral equivalent of 218 as compared to a theoretical value of 214, and melted at 109–112° C.

A portion (30 g.) of the above free acid was dissolved in 50 ml. of warm ethanol, and 16 g. of diisopropylamine was added to the clear solution. This mixture was cooled to about 5° C., whereupon ethyl diisopropylammonium 3,6-endoxohexahydrophthalate precipitated. This salt, after being recovered by filtration and air-dried, weighed 42 g. and melted at 147.5° C. with decomposition. Analysis. Calculated for $C_{16}H_{29}NO_5$: diisopropylamine, 32.1. Found: diisopropylamine, 31.6.

A 15 g. portion of the above free acid was dissolved in 100 ml. of ethanol, and to this solution was added sufficient of a 20° aqueous sodium hydroxide solution to produce a phenolphthalein endpoint. Acetone (1500 ml.) was added to this solution in order to precipitate ethyl sodium 3,6-endoxohexahydrophthalate. The precipitate was filtered and air-dried.

Ethyl potassium 3,6-endoxohexahydrophthalate may be prepared in the same manner as the sodium salt, the free acid being neutralized with aqueous potassium hydroxide.

EXAMPLE 2

A solution of 690 g. of exo-cis-3,6-endoxohexahydrophthalic anhydride in 2000 ml. of methanol was refluxed for 1 hour. The mixture was cooled to about 5° C., and the methyl hydrogen 3,6-endoxohexahydrophthalate which crystallized out was filtered off and air-dried. This product weighed 620 g., melted 140–142° C. with decomposition, and had a neutral equivalent of 198 as compared to a theoretical value of 200.

A portion (50 g.) of the above free acid was dissolved in 300 ml. of warm dioxane, and 27 g. of diisopropylamine was added to the solution. This mixture was cooled to about 5° C. in order to bring about crystallization of methyl diisopropylammonium 3,6-endoxohexahydrophthalate, which was recovered by filtration and air-dried. There was thus obtained 64 g. of the salt, melting at 139.5° C. with decomposition.

A 50 g. portion of the above free acid was suspended in 200 ml. of water, and concentrated aqueous sodium hydroxide was added until a phenolphthalein endpoint was reached. The resulting solution was evaporated at room temperature under reduced pressure, a solid mass being thus obtained. The solid was suspended in acetone and the mixture was filtered in order to recover methyl sodium 3,6-endoxohexahydrophthalate as a white solid. This salt is hygroscopic and therefore was stored in a desiccator over sulfuric acid.

A 50 g. portion of the above free acid was neutralized with potassium hydroxide, using essentially the same procedure as in the preceding paragraph. The resulting solution of methyl potassium 3,6-endoxohexahydrophthalate, upon evaporation under reduced pressure at room temperature, yielded a thick, viscous syrup. This syrup was stirred into about 2000 ml. of dioxane. The gelatinous suspension thus formed was filtered. The filter-cake was suspended in about 2000 ml. of acetone and the mixture was filtered to obtain the salt as a crystalline solid. This salt, which is hygroscopic, was stored in a desiccator over sulfuric acid.

EXAMPLE 3

A solution of 391 g. of exo-cis-3,6-endoxohexahydrophthalic anhydride in 1500 ml. of n-propanol was refluxed for 7 hours. The mixture was cooled to about 5° C., but no precipitate was obtained. Therefore, n-propanol was distilled off under reduced pressure until a solid phase appeared. The residue was cooled to about 5° C., and n-propyl hydrogen 3,6-endoxohexahydrophthalate was recovered by filtration and air-dried. This product, which weighed 390 g., melted at 114–115° C. and had a neutral equivalent of 231 as compared to a theoretical value of 228.

A portion (50 g.) of the above free acid was dissolved in 300 ml. of warm benzene, and 22.5 g. of diisopropylamine was added to the solution. The mixture was cooled to about 5° C. and 100 ml. of hexane was added. n-Propyl diisopropylammonium 3,6-endoxohexahydrophthalate precipitated. This product was recovered by filtration and dried; it weighed 58 g. and melted at 135° C. with decomposition.

A 50 g. portion of the above free acid was dissolved in 200 ml. of n-propanol. Concentrated aqueous sodium hydroxide was added until a phenolphthalein endpoint was reached. The resulting clear solution was evaporated under reduced pressure until n-propyl sodium 3,6-endoxohexahydrophthalate was obtained as a solid residue. This salt is hygroscopic.

The procedure of the preceding paragraph was employed to prepare n-propyl potassium 3,6-endoxohexahydrophthalate, using potassium hydroxide to neutralize the acid. The salt is hygroscopic.

Although the applicants do not wish to be bound by any particular theory as to the mechanism whereby the above-described useful plant response effects are produced, experimentation has strongly indicated that said effects are brought about by the existence in aqueous media of anions such as are represented by the structural formula above. A salient feature of this theory is that any acid of the invention, whether applied as the acid per se or in other form to a living plant, makes the corresponding anions available to the plant.

The desired anions are made available by virtue of the fact that the acids per se, and their equivalent forms, are water-soluble and ionizable. Therefore, when such a compound is absorbed into the vascular system of a plant, it dissolves in the aqueous plant juices and provides the functioning anions. The resulting physiological activity is believed to be ascribable to the presence of the anions, whether or not assisted by the presence of any particular cation species. The acids per se and their other forms may thus be regarded as very convenient media for furnishing the desired anions to susceptible portions of the plant.

It follows, therefore, that the acids per se and their other forms are equally usable.

In certain applications in certain regions, such as arid regions, some forms of the acids may be absorbed by the plant surfaces more efficiently than other forms. In humid regions, plants, such as cotton for instance, may absorb the active ingredients more readily than in arid regions. In the latter regions it is better to apply an acid in the form of a water solution of a salt which does not tend to crystallize on leaf surfaces, in admixture with an adjuvant, such as a wetting agent and/or humectant. However, it is to be understood that the active ingredient, irrespective of its physical form (e. g., in solution or as a dust), may be applied in some other way to assure its absorption by the plant, such as over or in a wounded surface, or by injection, or by direct application to the roots of the plant. Hence it may at times be a matter of choice and judgment as to the very best means of application of the particular compound in the particular region and for the particular purpose under consideration.

The acids per se have an appreciable solubility in water. The other forms are also soluble in water. Some of them are highly soluble. Others have a lesser degree of solubility. However, it is preferred to employ compounds having a solubility in water to the extent of at least 0.1% by weight, and still more particularly of at least 1% by weight.

From the foregoing it will be appreciated that for plant response purposes very low concentrations in applied aqueous solutions are effective.

The compounds are applied to the crop or plants in any desired manner, such as, in the form of a solid, for example by dusting, or in the form of a liquid, for example by spraying. They may also be employed by injection, such as into the stem of the plant, or at a point at which the epidermal layer is broken or wounded, or to the roots of the plant, or otherwise.

Compositions may be formulated by admixing the active ingredients with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc. Any of the commercial clays on the market in finely divided form are highly satisfactory, and particularly those which are normally employed as insecticide carriers. Commercial clays, it will be understood, are generally identified by trade names (reflecting the source and mode of processing) of which Homer Clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soybean, potato, cotton seed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more particularly through a 200 mesh sieve. Excellent results have been obtained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable, or synthetic origin, such as kerosene, fuel oil, lubricating oil, soybean oil, linseed oil, castor oil, sperm oil, cod liver oil, etc. For defoliation application, oils are usually selected which in themselves are relatively harmless to the plant.

Aqueous solutions or dispersions are economical and desirable. In general, the choice of the particular liquid carrier employed may be guided somewhat by prevailing circumstances, such as its availability, its solubility or dispersion characteristics toward the particular active agent employed, and/or its toxicity toward the plants undergoing treatment. In general, water is an excellent liquid carrier.

Thus spray formulations comprising the active ingredient in the form of a solution, suspension, or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface-active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and nonionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be understaken merely by agitating said mixture with the carrier, particularly when aqueous. The plant response agent, if not soluble in the carrier in the concentration desired, may be dispersed as such, or may be dissolved in a solvent, and emulsified by agitation with the carrier. This applies particularly when water and oil are employed as the carrier.

The concentration of surface-active agent in the final emulsion or dispersion should be sufficient to make the phases readily dispersible, and in general for this purpose from 0.02% to 2% is satisfactory. Any desired additional amount may be added, such as for adjuvant purposes, as will be understood. Thus, if the surface-active agent is to be premixed with the plant response agent, the selected relative proportions of the two will largely depend upon the purposes in mind. For mere purposes of forming spray emulsions or dispersions, mixtures containing a surface-active agent to the extent of from about 1% to about 25% by weight of plant response agent are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the plant.

The use, if desired, of adjuvants, such as wetting agents and/or humectants (water-retaining agents), is also contemplated in connection with solutions of the active ingredient, such as water solutions. Any suitable wetting agent and/or humectant may be employed for this purpose, such as the wetting agents more particularly referred to herein. Examples of humectants are glycerine, diethylene glycol, ethylene glycol, polyethylene glycols generally, and water-soluble sugars and sugar-containing mixtures, such as glucose, fructose, galactose, mannose, arabinose, xylose, sucrose, maltose, lactose, raffinose, trehalose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the psysiological behavior of the wetting agent after spraying upon the plant.

It should be considered that once the solution has been sprayed upon the plant, the concentration of wetting agent existing upon the leaf is in no sense a function of the concentration existing in the original spray solution. Thus, evaporation might concentrate the wetting agent considerably, or the presence of a dew on the leaf surface, or of plant juices on the leaf surface might considerably dilute this agent. Spray rates normally run from 1 to 20 gallons per acre. Dews may vary from possibly 10 to 2000 gallons per acre.

Wetting agents appear to serve the multiple purposes of aiding in the penetration of the leaf surface by the active ingredients, spreading of the active ingredients over the leaf area, and retarding or preventing crystallization in the case of those forms of the active ingredients which show a tendency to crystallize when the spray dries.

Although the active ingredients may be applied to growing plants in concentrated form, it is usually desirable to employ liquid or solid formulations, for example as discussed above in which the active ingredients constitute less than 30% by weight of the total, such as less than 10% and even as low as 0.1%.

Other substances than the carrier and/or surface-active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as fungicides, insecticides, bactericides, or types of plant response agents other than those agents discussed herein. The preparation of such additions and the materials added do not require elaboration, but will suggest themselves to persons skilled in the art upon becoming familiar herewith.

In practice of the process as applied to defoliation, the rate of application (i. e. the amount of active ingredient per crop unit) for best results will depend among other factors upon the species of plants being treated and upon their maturity. As a rule the more mature the plant at the time of application, the less active material is required. In practice the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Effective rates of application, for defoliation purposes, may sometimes be as low as 0.1 pound per acre when defoliating a susceptible plant at near maturity. Use of dosages greatly in excess of the minimum required for good defoliation may result in shock to the plant with attendant injury to the remainder of the plant.

In fact, the plant response agents of the present invention are effective herbicides when used in amounts substantially greater than those required for defoliation, and they may be used advantageously for the killing of plants or vines (as in the case of potatoes) when desired, such as, for the killing of undesired plants, for example weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents.

The applicants are familiar with U. S. Patent 2,471,790, wherein certain esters having some similarity to the compounds of the present invention are suggested as active ingredients of insect-affecting compositions. However, in accordance with the teachings of this patent, these prior art esters could not be plant response agents, for as is clearly brought out therein they may be compounded for application to plants for the destruction of ants, flies, chewing insects, aphids, and other insects.

The following examples illustrate the invention (generally and without limitation to the specific form of the active ingredients employed) as applied to the treatment of plants to produce plant responses including defoliation and herbicidal action.

In Examples 4, 5, 6, and 7 below, a group of plants was not treated and was kept as a control, the untreated group being similar to the treated group or groups. All plants (both treated and untreated) used for a test were of the same age and had been grown at the same time and under the same conditions. After the test was commenced, treated plants and untreated controls were again kept under the same conditions and therefore were subjected to comparable growing conditions. In all instances, the untreated controls grew normally.

EXAMPLE 4

The following compounds were employed in this test, the capital letters being the designations by which the compounds are identified in Table 1 below:

A. Methyl diisopropylammonium 3,6-endoxohexahydrophthalate.
B. Methyl sodium 3,6-endoxohexahydrophthalate.
C. Methyl potassium 3,6 - endoxohexahydrophthalate.

Aqueous solutions of known concentrations of the respective compounds were prepared. In the case of each solution, a 0.05 ml. aliquot was injected by means of a small hypodermic needle into the hypocotyl of each plant of a separate group comprising four Dwarf Horticultural bean plants. The plants varied in height from about 7 inches to 9.5 inches, and the trifoliate shoots had developed considerably. The dosage of active ingredients per plant was calculated.

Observations made five days after treatment are summarized in Table 1.

Several symbols are used in this table and other tables, their meanings being as follows:

lt=light or lightly
mod=moderate or moderately
sev=severe or severely
bn=burned
adh=adhering
C=untreated control
PL=primary leaves
TL=trifoliate leaves 2S, for example, means each of two plants had a single primary leaf abscised; 4B, for example, means each of four plants had both primary leaves abscised.

The term "frozen" or "shrivelled" as used to describe a condition of the leaves of a plant treated with a defoliant denotes that condition in which the leaves have undergone such a quick and drastic response that no abscission layer has formed. The leaves then cling tenaciously to the plant although the leaf blade and petiole are dead and shrivelled, and show no tendency to abscise. Thus, "freezing" or "shrivelling" of leaves indicates a more phytotoxic condition than when the leaves actually abscise.

It has been demonstrated that bean plants such as those used in this example, and even much younger plants, are not injured by the mere process of injection with a liquid containing no phytotoxicant. For example, 0.05 ml. aliquots of a 50% solution of acetone in water were injected into young mean plants by the above technique. Such treated plants have been observed for as long as nineteen days, and no injury was noted.

EXAMPLE 5

Two compounds were employed in this test, the compounds and the designations used to identify them in Table 2 being as follows:

A. Methyl hydrogen 3,6 - endoxohexahydrophthalate.
B. Methyl potassium 3,6 - endoxohexahydrophthalate.

Aqueous solutions of known concentrations of the respective compounds were spray-misted by means of a small De Vilbiss atomizer onto individual groups of sixteen potted Dwarf Horticultural bean plants, the plants being at a stage of growth at which the first trifoliate leaf was still furled.

Each group of sixteen plants was arranged uniformly in a 2 foot by 3 foot area, and 3 ml. of test solution was uniformly sprayed in the described manner onto the area. This rate of application corresponds to approximately 6 gallons per acre; this low volume rate simulates practical conditions of aeroplane spraying. The amount of active ingredient was 0.5, 1.0, 2.0, 4.0, and 8.0 ounces, respectively, per acre.

Observations made five days after the plants were treated are given in Table 2.

TABLE 2
*Physiological effects*

| Compound | Active ingredient, ounces per acre | | | | |
|---|---|---|---|---|---|
| | 0.5 | 1.0 | 2.0 | 4.0 | 8.0 |
| A | As C | 1S; adh PL—lt bn | 3B, 2S; adh PL—lt to mod bn. | 3B; 8S; adh PL—mod bn. | 9B, 3S; adh PL—sev bn. |
| B | PL—lt bn | 2B; adh PL—lt bn | 1B, 5S; adh PL—lt bn. | 10B, 6S; adhPL—mod bn. | 6B, 9S; adh PL—sev bn; 1 plant dead. |

TABLE 1
*Physiological effects*

| Compound | Active ingredient per plant | |
|---|---|---|
| | 12.5 micrograms | 125 micrograms |
| A | 1B; TL unaffected to lt bn | 3B; TL—lt bn. |
| B | 2B, 1S; TL—mod bn | 4B; TL—shrivelled. |
| C | 2S; TL—as C | Do. |

EXAMPLE 6

The compounds employed in this test and the designations used to identify them in Table 3 are as follows:

A. Ethyl hydrogen 3,6-endoxohexahydrophthalate.
B. Ethyl diisopropylammonium 3,6-endoxohexahydrophthalate.

The spray-misting technique of Example 5 was used to apply aqueous solutions of known concentrations of these compounds to individual groups of bean plants of the same number, variety, and stage of growth as described in that example. The dosage of active ingredient was 0.5, 1.0, 2.0, 4.0, and 8.0 ounces, respectively, per acre.

Observations were made five days after treatment, with results as given in Table 3.

TABLE 3

*Physiological effects*

| Compound | Active ingredient, ounces per acre | | | | |
|---|---|---|---|---|---|
| | 0.5 | 1.0 | 2.0 | 4.0 | 8.0 |
| A | As C | Lt bn | 1B, 2S; adh PL—lt bn. | 6B, 3S; adh PL—mod bn. | 7B, 4S; adh PL—mod bn. |
| B | do | do | 1B; adh PL—lt bn | 4B, 2S; adh PL—mod bn. | 5B, 5S; adh PL—mod bn. |

EXAMPLE 7

Aqueous solutions of methyl sodium 3,6-endoxohexahydrophthalate were sprayed by means of a pressure sprayer (at a constant pressure of 30 p. s. i.) onto individual plots of Golden millet, a monocotyledenous plant. The millet was young and had an average approximate height of 4 inches. The concentrations of active ingredient in the test solutions employed were 0.062%, 0.125%, 0.25%, 0.5%, 1.0%, and 2.0%, respectively, and the solutions contained 0.1% of a high molecular weight alkyl polyglycolthioether as a wetting agent.

Each plot had an area of 10 square feet, and 87 ml. of test solution was uniformly sprayed onto the area in the manner described. This rate of application corresponds to approximately 100 gallons per acre. Thus the dosage per acre of the active ingredient amounted to 0.5, 1.0, 2.0, 4.0, 8.0, and 16.0 pounds, respectively.

The test plots were observed eight days after treatment. The plot which had been treated with the lowest dosage of the active ingredient was not affected. A slight buring effect was noted at a dosage of 1.0 pound per acre, and the degree of plant injury increased with increasing dosage of active ingredient. At a dosage of 16.0 pounds per acre, the millet was severely injured; many plants were dead and the rest were moribund.

Substantially the same results were obtained in the case of ethyl sodium 3,6-endoxohexahydrophthalate, which was tested at the same time and in the same manner as above.

EXAMPLE 8

The active ingredients employed in this example, and the designations by which they are identified in Table 4, are as follows:

A. Methyl hydrogen 3,6-endoxohexahydrophthalate.
B. Ethyl hydrogen 3,6-endoxohexahydrophthalate.
C. n - Propyl hydrogen 3,6 - endoxohexahydrophthalate.
D. Methyl diisopropylammonium 3,6-endoxohexahydrophthalate.
E. Ethyl diisopropylammonium 3,6-endoxohexahydrophthalate.
F. n-Propyl diisopropylammonium 3,6-endoxohexahydrophthalate.

Aqueous solutions of known concentrations (10, 100, 1000, and 10,000 parts per million, respectively) of the respective active ingredients were prepared.

In the case of each solution, a 15 ml. aliquot was pipetted into a petri dish (150 mm. diameter) in which had been placed a filter paper, 125 mm. in diameter. Approximately 100 Japanese buckwheat seeds were distributed evenly over the filter paper. The petri dish cover was then placed in position.

The seeds contained in the series of culture dishes were incubated at room temperature (approximately 75–85° F.) for five days. As controls, three culture dishes, each containing approximately 100 seeds and 15 ml. of water, but no active ingredient, were kept under the same conditions as the other culture dishes.

At the end of the incubation period, the seeds and/or seedlings which had been exposed to the active ingredients were compared with the controls as to: (1) inhibition of germination; (2) retardation of root growth; and (3) retardation of shoot growth.

For purposes of reporting the observed results in Table 4 (as well as in Tables 5 and 6), a numerical scale has been used, with meanings as follows:

6=approximately as controls.
5=approximately 10–25% inhibition or retardation.
4=approximately 25–50% inhibition or retardation.
3=approximately 50–85% inhibition or retardation.
2=approximately 85–98% inhibition or retardation.
1=approximately 98–100% inhibition or retardation.

TABLE 4

*Physiological effects*

| Compound | Active ingredient, parts per million | | | | | | | | | | | |
|---|---|---|---|---|---|---|---|---|---|---|---|---|
| | 10 | | | 100 | | | 1,000 | | | 10,000 | | |
| | Germ. inhib. | Root retard. | Shoot retard. | Germ. inhib. | Root retard. | Shoot retard. | Germ. inhib. | Root retard. | Shoot retard. | Germ. inhib. | Root retard. | Shoot retard. |
| A | 6 | 5 | 6 | 6 | 2 | 3 | 3 | 2 | 2 | 1 | 1 | 1 |
| B | 6 | 6 | 6 | 6 | 3 | 4 | 6 | 2 | 2 | 1 | 1 | 1 |
| C | 6 | 6 | 6 | 6 | 3 | 4 | 6 | 2 | 2 | 1 | 1 | 1 |
| D | 6 | 2 | 5 | 6 | 2 | 3 | 3 | 2 | 2 | 1 | 1 | 1 |
| E | 6 | 6 | 6 | 6 | 3 | 5 | 6 | 2 | 3 | 2 | 2 | 2 |
| F | 6 | 6 | 6 | 6 | 3 | 5 | 6 | 2 | 3 | 2 | 2 | 2 |

EXAMPLE 9

The active ingredients employed in this example, and the designations by which they are identified in Table 5, are as follows:

A. Methyl sodium 3,6-endoxohexahydrophthalate.
B. Ethyl sodium 3,6-endoxohexahydrophthalate.
C. n-Propyl sodium 3,6-endoxohexahydrophthalate.
D. Methyl potassium 3,6-endoxohexahydrophthalate.
E. Ethyl potassium 3,6-endoxohexahydrophthalate.
F. n-Propyl potassium 3,6-endoxohexahydrophthalate.

The procedure of Example 8 was employed to test the effects of the above respective active ingredients on the germination of Thorne wheat seeds and on the development of the roots and shoots of the seedlings.

The results, as observed after five days incubation, were as shown in Table 5.

TABLE 5

*Physiological effects*

| Compound | Active ingredient, parts per million | | | | | | | | | | | |
|---|---|---|---|---|---|---|---|---|---|---|---|---|
| | 10 | | | 100 | | | 1,000 | | | 10,000 | | |
| | Germ. inhib. | Root retard. | Shoot retard. | Germ. inhib. | Root retard. | Shoot retard. | Germ. inhib. | Root retard. | Shoot retard. | Germ. inhib. | Root retard. | Shoot retard. |
| A | 6 | 4 | 4 | 5 | 3 | 3 | 2 | 2 | 2 | 1 | 1 | 1 |
| B | 6 | 4 | 4 | 5 | 2 | 3 | 2 | 1 | 2 | 1 | 1 | 1 |
| C | 6 | 6 | 5 | 5 | 2 | 3 | 3 | 3 | 3 | 2 | 2 | 2 |
| D | 6 | 6 | 6 | 6 | 4 | 4 | 5 | 2 | 3 | 2 | 2 | 2 |
| E | 6 | 6 | 6 | 6 | 5 | 5 | 6 | 4 | 4 | 2 | 2 | 2 |
| F | 6 | 5 | 5 | 6 | 4 | 4 | 3 | 2 | 2 | 1 | 1 | 1 |

EXAMPLE 10

The active ingredients employed in this example, and the designations by which they are identified in Table 6, are as follows:

A. Methyl hydrogen 3,6-endoxohexahydrophthalate.
B. Methyl sodium 3,6-endoxohexahydrophthalate.
C. Methyl potassium 3,6-endoxohexahydrophthalate.
D. Methyl diisopropylammonium 3,6-endoxohexahydrophthalate.

The procedure of the two examples immediately preceding was employed to test the effects of the above active ingredients on the germination of mung bean seeds and on the development of the roots and shoots of the seedlings.

The results, observed after five days incubation, are given in Table 6.

From the foregoing it can be seen that the acids used in the practice of this invention, whether used per se or in chemically equivalent form, are highly effective in regulating the growth characteristics of viable or living plants, and particularly of plants having vascular systems. For example, the acids may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of patentable novelty reside in the invention.

This application is a continuation-in-part of our co-pending application Serial No. 81,026, filed March 11, 1949 and issued as U. S. Patent No. 2,576,080 on November 20, 1951.

We claim:

1. A method for inducing response in a living plant having a vascular system, comprising bringing into association with said vascular system of said plant an effective amount of anions of exo-cis configuration and conforming to the structure

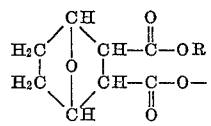

in which R represents an alkyl radical selected from the group consisting of primary and sec-

TABLE 6

*Physiological effects*

| Compound | Active ingredient, parts per million | | | | | | | | | | | |
|---|---|---|---|---|---|---|---|---|---|---|---|---|
| | 10 | | | 100 | | | 1,000 | | | 10,000 | | |
| | Germ. inhib. | Root retard. | Shoot retard. | Germ. inhib. | Root retard. | Shoot retard. | Germ. inhib. | Root retard. | Shoot retard. | Germ. inhib. | Root retard. | Shoot retard. |
| A | 6 | 3 | 5 | 6 | 2 | 4 | 1 | 1 | 1 | 1 | 1 | 1 |
| B | 6 | 2 | 4 | 6 | 2 | 2 | 1 | 1 | 1 | 1 | 1 | 1 |
| C | 6 | 3 | 4 | 6 | 2 | 3 | 1 | 1 | 1 | 1 | 1 | 1 |
| C | 6 | 3 | 4 | 6 | 2 | 3 | 1 | 1 | 1 | 1 | 1 | 1 | ondary alkyl radicals having from 1 to 8 carbon atoms.

2. A method for inducing response in a living plant which comprises applying to the surface of said plant in amount sufficient to produce said response at least one compound which when in the presence of water yields anions of exo-cis configuration and conforming to the structure

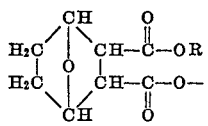

in which R represents an alkyl radical selected from the group consisting of primary and secondary alkyl radicals having from 1 to 8 carbon atoms.

3. The process of claim 2 in which an applied compound is methyl hydrogen exo-cis-3,6-endoxohexahydrophthalate.

4. The process of claim 2 in which an applied compound is ethyl hydrogen exo-cis-3,6-endoxohexahydrophthalate.

5. The process of claim 2 in which an applied compound is isopropyl hydrogen exo-cis-3,6-endoxohexahydrophthalate.

6. The process of claim 2 in which an applied compound is ethyl sodium exo-cis-3,6-endoxohexahydrophthalate.

7. The process of claim 2 in which an applied compound is ethyl triethylammonium exo-cis-3,6-endoxohexahydrophthalate.

8. A composition prepared for use as a plant response agent which comprises a wetting agent and at least one compound which when in the presence of water yields anions of exo-cis configuration and conforming to the structure

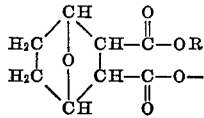

in which R represents an alkyl radical selected from the group consisting of primary and secondary alkyl radicals having from 1 to 8 carbon atoms.

9. A composition prepared for use as a plant response agent which comprises a wetting agent, a carrier, and at least one compound which when in the presence of water yields anions of exo-cis configuration and conforming to the structure

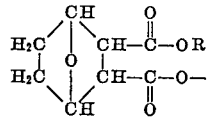

in which R represents an alkyl radical selected from the group consisting of primary and secondary alkyl radicals having from 1 to 8 carbon atoms.

10. The composition of claim 9 in which the carrier is a liquid.

11. The composition of claim 9 in which the carrier is a finely divided solid.

12. A composition prepared for use as a plant response agent which comprises a wetting agent and methyl hydrogen exo-cis-3,6-endoxohexahydrophthalate.

13. A composition prepared for use as a plant response agent which comprises a wetting agent and ethyl hydrogen exo-cis-3,6-endoxohexahydrophthalate.

14. A composition prepared for use as a plant response agent which comprises a wetting agent and isopropyl hydrogen exo-cis-3,6-endoxohexahydrophthalate.

15. A composition prepared for use as a plant response agent which comprises a wetting agent and ethyl sodium exo-cis-3,6-endoxohexahydrophthalate.

16. A composition prepared for use as a plant response agent which comprises a wetting agent and ethyl triethylammonium exo-cis-3,6-endoxohexahydrophthalate.

NATHANIEL TISCHLER.
ERNEST P. BELL.

No references cited.